United States Patent
Berry et al.

(10) Patent No.: US 9,690,900 B2
(45) Date of Patent: *Jun. 27, 2017

(54) INTRA-RUN DESIGN DECISION PROCESS FOR CIRCUIT SYNTHESIS

(71) Applicant: International Business Machines Corporation, Armonk, NY (US)

(72) Inventors: Christopher J. Berry, Hudson, NY (US); Lakshmi Reddy, Briarcliff Manor, NY (US); Sourav Saha, Kolkata (IN); Matthew M. Ziegler, Sleepy Hollow, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/837,102

(22) Filed: Aug. 27, 2015

(65) Prior Publication Data

US 2017/0004246 A1    Jan. 5, 2017

Related U.S. Application Data

(63) Continuation of application No. 14/754,987, filed on Jun. 30, 2015.

(51) Int. Cl.
  *G06F 17/50* (2006.01)
(52) U.S. Cl.
  CPC ........ *G06F 17/5081* (2013.01); *G06F 17/505* (2013.01); *G06F 17/5022* (2013.01)
(58) Field of Classification Search
  CPC . G06F 17/505; G06F 17/5022; G06F 17/5081

USPC ................ 716/105, 106, 107, 111, 132, 136; 703/16

See application file for complete search history.

(56) References Cited

U.S. PATENT DOCUMENTS

| 6,308,313 | B1* | 10/2001 | Lakshminarayana | G06F 17/5045 716/104 |
| 9,529,951 | B2* | 12/2016 | Gristede | G06F 17/5022 |
| 2005/0062496 | A1* | 3/2005 | Gidon | G06F 17/505 326/40 |

(Continued)

OTHER PUBLICATIONS

List of IBM Patents or Patent Applications Treated as Related; (Appendix P), Filed Aug. 27, 2015; 2 pages.

(Continued)

*Primary Examiner* — Phallaka Kik
(74) *Attorney, Agent, or Firm* — Cantor Colburn LLP; Margaret A. McNamara

(57) ABSTRACT

A system and method of performing an intra-run decision during synthesis to determine a physical implementation of a system-on-chip (SoC) logic design are described. The method includes executing a stage of the synthesis with two or more scenarios, each scenario representing a unique combination of values of one or more parameters, and determining a quality measure associated with each of the two or more scenarios. The method also includes performing the intra-run decision by eliminating one or more of the two or more scenarios for execution in a subsequent stage of the synthesis based on the quality measure associated with each of the two or more scenarios.

8 Claims, 4 Drawing Sheets

(56) References Cited

U.S. PATENT DOCUMENTS

| | | | | |
|---|---|---|---|---|
| 2010/0031206 A1* | 2/2010 | Wu | .................... | G06F 17/5063 |
| | | | | 716/132 |
| 2010/0318492 A1* | 12/2010 | Utsugi | .............. | G06F 17/30286 |
| | | | | 707/603 |
| 2012/0036138 A1* | 2/2012 | Carrion | ................. | G06F 17/505 |
| | | | | 707/748 |
| 2012/0226890 A1* | 9/2012 | Yoshida | ................ | G06F 17/505 |
| | | | | 712/1 |
| 2013/0305198 A1* | 11/2013 | Yamamoto | ............ | G06F 17/505 |
| | | | | 716/104 |
| 2015/0347641 A1* | 12/2015 | Gristede | ............. | G06F 17/5022 |
| | | | | 716/104 |
| 2016/0147932 A1* | 5/2016 | Liu | ....................... | G06F 17/505 |
| | | | | 716/132 |

OTHER PUBLICATIONS

Christopher J. Berry et al., "Intra-Run Design Decision Process for Circuit Synthesis", U.S. Appl. No. 14/754,987, filed Jun. 30, 2015.
George Diedrich Gristede et al., "Synthesis Tuning System for VLSI Design Optimization", U.S. Appl. No. 14/290,886, filed May 29, 2014.
List of IBM Patents or Patent Applications Treated as Related; (Appendix P), Filed Dec. 15, 2016; 2 pages.
George Diedrich Gristede et al., "Synthesis Tuning System for VLSI Design Optimization", U.S. Appl. No. 15/358,615, filed Nov. 22, 2016.

* cited by examiner

INTRA-RUN DESIGN DECISION PROCESS FOR CIRCUIT SYNTHESIS

DOMESTIC BENEFIT/NATIONAL STAGE INFORMATION

This application is a continuation of U.S. application Ser. No. 14/754,987 filed Jun. 30, 2015, the disclosure of which is incorporated by reference herein in its entirety.

BACKGROUND

The present invention relates to system-on-a-chip (SoC) design, and more specifically, to an intra-run design decision process for circuit synthesis.

In SoC design, a register-transfer level (RTL) design is implemented in a physical design based on processes that include high-level synthesis, logic synthesis, and physical synthesis. As part of one or more of the synthesis processes, different synthesis scenarios may be tried by modifying synthesis parameters (e.g., switch settings). A given synthesis run typically includes several stages. Parameters are often enacted at different stages of a synthesis run. Thus, parallel scenarios are possible at certain stages to consider different parameters, and parallel processing may be used to implement parallel runs. While an exhaustive trial of every scenario (every combination of parameters) may result in the most efficient physical design, each synthesis run represents a drain on available computational resources and disk space.

SUMMARY

According to one embodiment of the present invention, a method of performing an intra-run decision during synthesis to determine a physical implementation of a system-on-chip (SoC) logic design includes executing, using a processor, a stage of the synthesis with two or more scenarios, each scenario representing a unique combination of values of one or more parameters; determining, using the processor, a quality measure associated with each of the two or more scenarios; and performing the intra-run decision by eliminating one or more of the two or more scenarios for execution in a subsequent stage of the synthesis based on the quality measure associated with each of the two or more scenarios.

According to another embodiment, a system to perform an intra-run decision during synthesis to determine a physical implementation of a system-on-chip (SoC) logic design includes a memory device configured to store instructions and information; and a processor configured to execute the instructions to execute a stage of the synthesis with two or more scenarios, each scenario representing a unique combination of values of one or more parameters, determine a quality measure associated with each of the two or more scenarios, and perform the intra-run decision to eliminate one or more of the two or more scenarios for execution in a subsequent stage of the synthesis based on the quality measure associated with each of the two or more scenarios.

According to yet another embodiment, a computer program product performs intra-run decision making during synthesis to determine a physical implementation of a system-on-chip (SoC) logic design. The computer program product comprises a computer readable storage medium having program code embodied therewith, the program code executable by a processor to perform a method including executing a stage of the synthesis with two or more scenarios, each scenario representing a unique combination of values of one or more parameters; determining a quality measure associated with each of the two or more scenarios; and performing the intra-run decision by eliminating one or more of the two or more scenarios for execution in a subsequent stage of the synthesis based on the quality measure associated with each of the two or more scenarios.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

As noted above, synthesis is a part of SoC design that facilitates translation of the logic design to a physical implementation. Different parameters representing different scenarios may be tried in different runs of the synthesis process to determine the desired physical implementation. However, as also noted above, trying too many scenarios can tax the computational and disk space resources of the design system. Previously, two techniques were generally discussed as ways to cut resource usage in synthesis runs. These techniques include checkpointing and forking. Embodiments of the systems and methods detailed herein relate to pruning and combining pruning with checkpointing and forking in order to increase the number of scenarios considered in the synthesis while reducing resource usage. The embodiments discussed herein with reference to synthesis may apply to high-level, logic, and physical synthesis generally. The change or improvement in synthesis results for different sets of parameters (scenarios) may be judged based on differences in quality of results (QOR) associated with the different scenarios. The QOR for each run may be determined in terms of timing, power consumption, and congestion. As used below, fork, forking, and fanout all refer to generating scenarios by combining parameter values or parameter combinations from one stage with two or more parameter values or parameter combinations in a subsequent stage.

Figure 1:
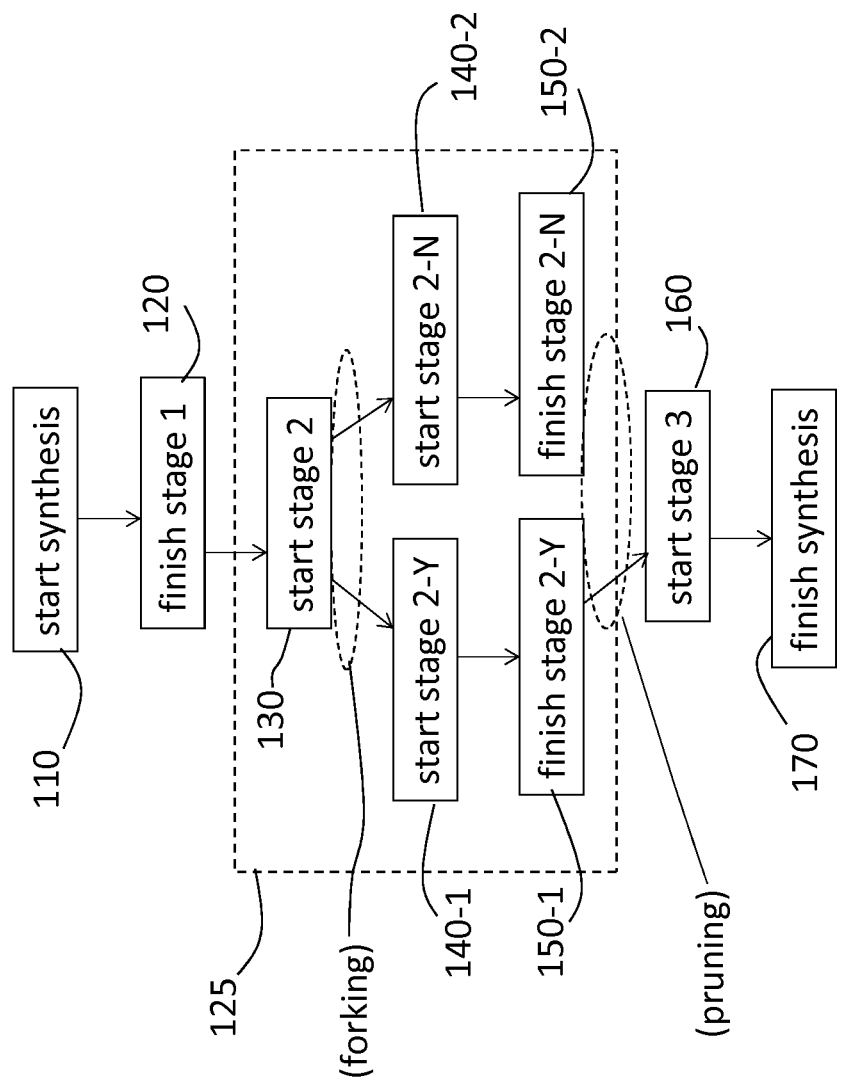
FIG. 1 illustrates an exemplary synthesis process flow according to embodiments.

FIG. 1 illustrates an exemplary synthesis process flow according to embodiments. The exemplary synthesis has three stages. At block 110, starting the synthesis includes setting parameters and executing the run to finish stage 1 at block 120. Checkpointing means beginning the synthesis at an intermediate point (stage after stage 1) based on stored results up to that point (stage). Thus, if checkpointing were used, the processes shown in FIG. 1 could begin with the results of the completion of stage one (begin with the processes 125 using results previously stored at block 120). At block 130, starting stage 2 involves a forking, as indicated in FIG. 1. That is, stage 2 forks into two parallel scenarios (Y and N) that could be run in parallel. The two parallel scenarios represent different parameter values or different combinations of parameter values. Each of the forked stages starts at blocks 140-1 and 140-2 and ends at blocks 150-1 and 150-2, as shown in FIG. 1. The QOR based on results at blocks 150-1 and 150-2 may be compared to perform pruning. Pruning refers to terminating one of the branches (scenarios), in this case branch N, such that starting stage 3, at block 160, is with one set of parameters (one scenario). Finishing synthesis at block 170 refers to completing any remaining stages after stage 3. As FIG. 1 illustrates, by comparing QOR at an intermediate stage (the end of stage 2, in the example), one of the forked scenarios could be pruned or terminated. The pruning facilitates consideration of parameter values or combinations of in stage 2-N without a penalty in resources based on that consideration. This is because, once the scenario is found to provide worse results than another scenario (scenario of stage 2-Y), the pruning allows resource usage for that scenario to end rather than continue all the way to the end of synthesis.

Figure 2:
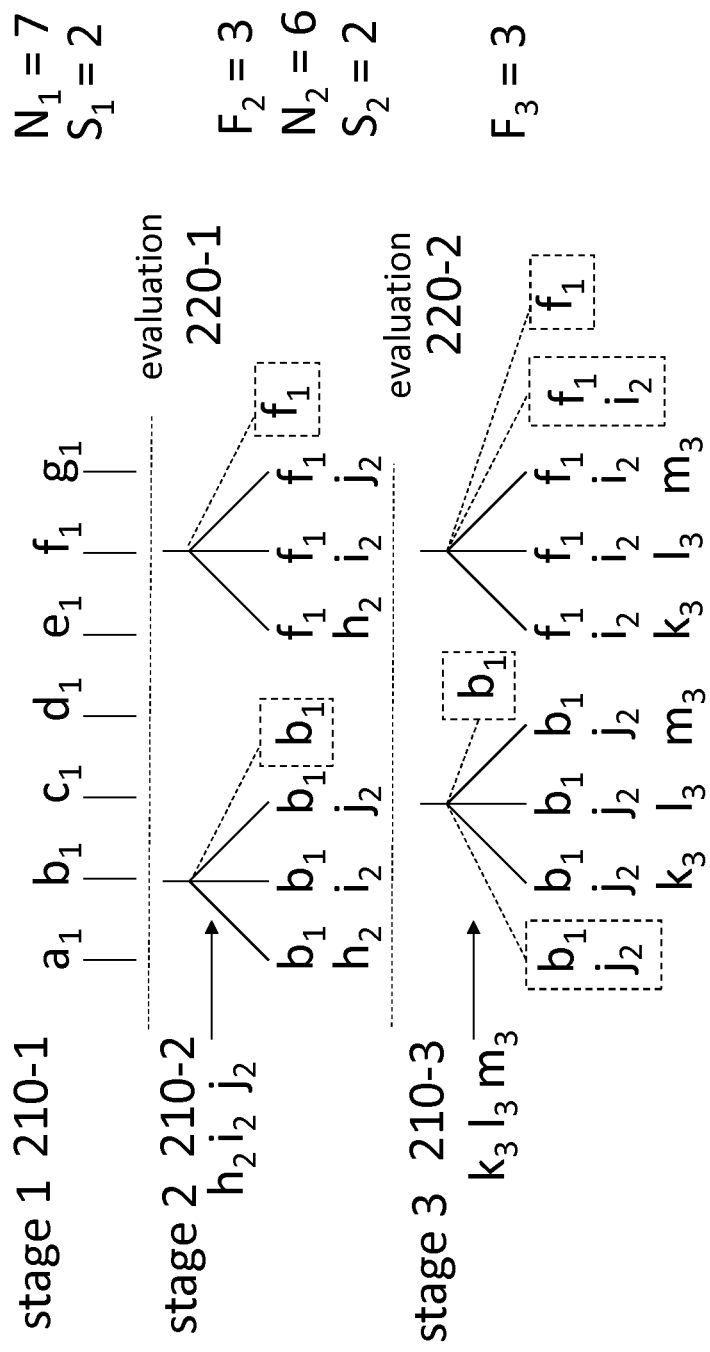
FIG. 2 illustrates exemplary synthesis at different stages according to an embodiment.

FIG. 2 illustrates exemplary synthesis at different stages according to embodiments. The number of scenarios N at each stage i, the number of surviving scenarios S after each stage i, and the number of forks or fanouts F at each stage i are indicated in FIG. 2. As noted above, each scenario represents a unique parameter value (when only one parameter is involved) or a unique combination of parameter values (when two or more parameters are involved). At stage 1 210-1, there may only be one parameter value to set, and that parameter may be set to seven different values represented by $a_1$ through $g_1$, for example. Alternately, there may be multiple parameters that are set at stage 1 210-1, resulting in seven different combinations $a_1$ through $g_1$. At stage 1 210-1, out of seven possible sets of parameter values or parameters or scenarios ($a_1$ through $g_1$) such that $N_1=7$, only scenarios $b_1$ and $f_1$ are continued into stage 2 based on a pruning process ($S_1=2$). That is, the evaluation 220-1 after stage 1 is completed may include comparing QOR resulting from each of the scenarios a1 through g1. Based on that evaluation 220-1, the two surviving scenarios after stage 1 210-1 are $b_1$ and $f_1$. The selection of surviving scenarios (scenarios that are not pruned) based on the result of the evaluation 220-1 may be done in different ways, as further discussed below. For example, the top two scenarios (the scenarios resulting in the highest two QOR values) may always be selected. Alternately, all scenarios whose QOR exceeds a threshold value may be selected to be continued (not pruned). In the example shown in FIG. 2, only two scenarios ($b_1$ and $f_1$) may have resulted in QORs that exceed the threshold. At each stage, the criteria for pruning or retaining scenarios may be different, as further discussed below.

At stage 2 210-2, three fanouts or forks ($F_2=3$) are used to test three different parameter values or combinations of parameters (h2, i2, j2) with each of the surviving scenarios (b1, f1) from stage 1 210-1. As a result, the number of scenarios in stage 2 210-2 is 6 ($N_2=6$). That is, the number of scenarios considered at a given stage is determined by the number of surviving scenarios (S) of the previous stage and the number of parameter values or parameter combinations to be tried at the given stage, which is represented by the number of forks or fanouts (F) at the given stage:

$$N_{i+1}=S_i \times F_{i+1} \quad [\text{EQ. 1}]$$

At the end of stage 2 210-2, another evaluation 220-2 is performed. As noted above, the evaluation 220-2 may be based on QOR associated with each of the six scenarios run in stage 2 210-2 and may look for the highest two QOR values (or some other number of highest QOR values) or may select to continue all scenarios whose associated QOR exceeds a threshold. All other scenarios are pruned. According to this procedure, in the example shown in FIG. 2, two scenarios survive ($S_2=2$) at the end of stage 2 210-2. That is, the combination of $b_1$ and $j_2$ and the combination of $f_1$ and $i_2$ are continued into stage 3 210-3. As noted above, each of $b_1$, $j_2$, $f_1$, and $i_2$ may be a particular value of one parameter or a set of particular values for two or more parameters. Three parameter values or parameter combinations ($k_3$, $l_3$, $m_3$) are to be considered in stage 3 210-3. Thus, the forking or fanout at stage 3 210-3 is $F_3=3$. That is, each of the two combinations (combination $b_1$ and $j_2$ and combination $f_1$ and $i_2$) that survived stage 2 210-2 are combined with three different scenarios $k_3$, $l_3$, $m_3$ in stage 3 210-3, as shown in FIG. 2. This results in six scenarios ($N_3=6$) considered in stage 3 210-3. The process described above (e.g., an evaluation 220 at the end of each stage 210, followed by pruning, as needed) would continue through every stage of synthesis. As the evaluations 220-1, 220-2 and subsequent pruning illustrate, many more combinations can be considered than are carried through to the last stage of a synthesis run. As a result, with minimal resource usage, synthesis results can be maximized.

Rules may be established to account for the fact that some parameters or parameter combinations (scenarios) may not improve QOR immediately but may prove advantageous in a later stage. These rules may be established based on a baseline or previously archived results. The baseline scenario is further discussed below. As an example of one of these rules, a surviving scenario from one stage may be flagged to be continued to the end, even if scenarios stemming from that surviving scenario do not survive in subsequent stage. For example, in the example discussed with reference to FIG. 2, $b_1$ and $f_1$ are surviving scenarios after stage 1 210-1. According to this alternate embodiment of the baseline scenario, two additional scenarios, one containing only $b_1$ and another containing only $f_1$ may be forked and continue through the following steps without additional parameters being enabled (none of $h_2$, $i_2$, or $j_2$ or $k_3$, $l_3$, or $m_3$ are added in subsequent stages). This is indicated by dashed lines. Likewise, after evaluation 220-2 a scenario containing $b_1+j_2$ and a scenario containing $f_1+i_2$ may be forked (as indicated by the dashed lines). This leads to a full coverage of the scenario space where parameters from either one, two, or all three steps (according to the example shown in FIG. 2) are enabled.

As noted above, evaluation 220 after each stage may be performed based on a comparison of QOR resulting from each scenario. Some number of scenarios associated with the top QOR values may be retained or all scenarios associated with QOR values that exceed a threshold may be retained (all scenarios associated with QOR values below the threshold may be pruned). According to an exemplary embodiment, a baseline scenario may be run. This baseline scenario may be run live (in conjunction with test scenarios) or may be pre-run such that the results are archived. The baseline run may represent a metric by which other scenarios are judged. That is, rather than a pre-defined threshold QOR, the baseline scenario QOR at a given stage may be used to evaluate scenarios. The baseline run, whose resource cost is known, may be used to determine how much pruning to do at a given stage to maintain a specified level of resource usage. Every scenario run may be recorded in a report for comparison with the baseline. Some scenarios may be blacklisted in the interest of resource usage. For example, the highlighted combination (scenario) consisting of $b_1$, $j_2$, $m_3$ may be blacklisted (pruned despite evaluation results that indicate that the scenario should be continued to subsequent stages). The blacklisting may be based on several factors. For example, that particular combination or scenario may be part of the baseline such that its results are already known and the other scenarios are run as a comparison. As another example, the combination may be known to be undesirable based on archived data of test runs.

Figure 3:
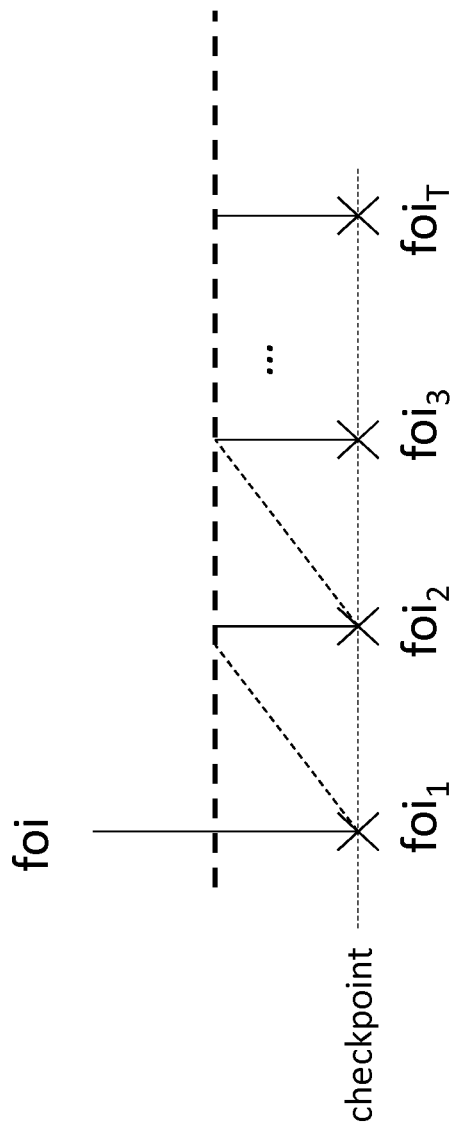
FIG. 3 illustrates iteration handling for a scenario during synthesis according to embodiments.

FIG. 3 illustrates iteration handling for a scenario during synthesis according to embodiments. In some stages and with respect to some parameters, some operations may be done iteratively during the synthesis process. Currently, the number of iterations is fixed. However, the pruning process may be applied, as detailed below, to determine an optimal number of iterations. In FIG. 3, foi stands for fine optimization iteration. The total number (T) of iterations or foi operations that are done in a stage (for a given scenario) may be determined in several ways. As shown in FIG. 3, a checkpoint may be set at the end of each iteration at which QOR is determined, for example. Other output or output combinations may be checked as a quality measure instead of QOR in alternate embodiments. In the example shown in FIG. 3, the first iteration ($foi_1$) is run until the checkpoint and then the next iteration ($foi_2$) is run. A total of T iterations is run with an evaluation at the checkpoint at the end of each iteration. The total number of iterations T may be determined based on when a threshold quality value (e.g., QOR) is reached. Alternately or additionally, performance degradation may be used to determine T. That is, additional iterations may be stopped when a degradation in performance quality (e.g., QOR) is noted. Alternately or additionally, a runtime limit may be set such that T is the total number of iterations that are run within the runtime limit. That is, additional iterations are stopped once the runtime limit is reached.

Figure 4:
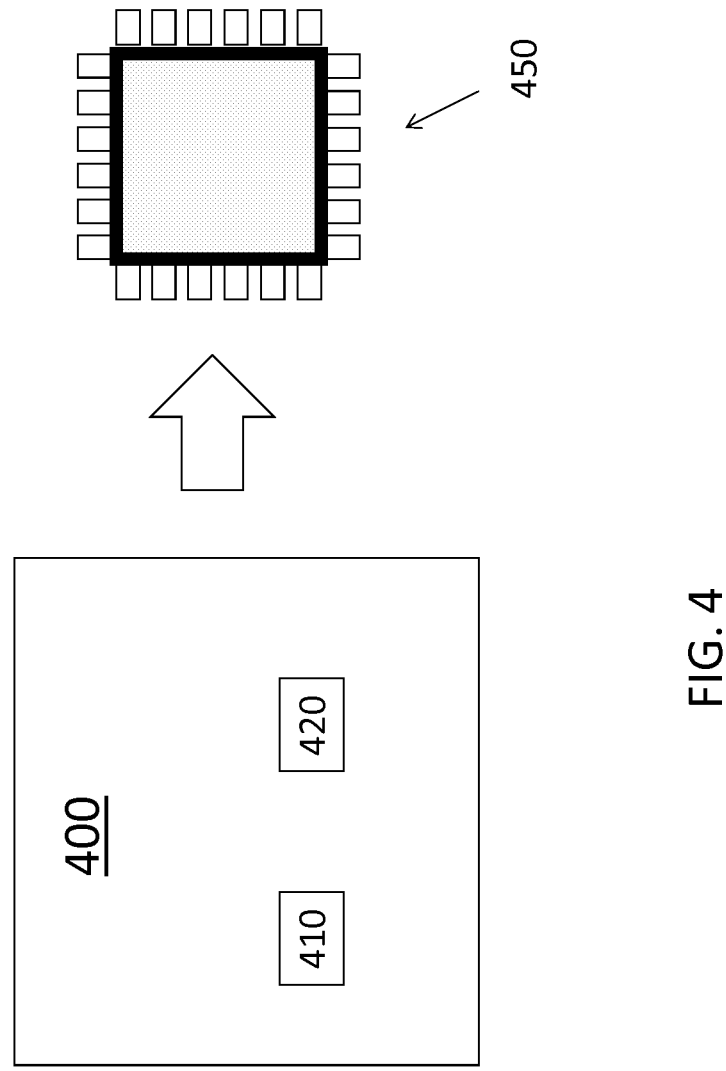
FIG. 4 is a block diagram of a system that performs synthesis according to embodiments discussed herein.

FIG. 4 is a block diagram of a system 400 that performs synthesis according to embodiments discussed herein. The system 400 includes one or more memory devices and one or more processing circuits or processors 420. The physical design determined using the system 400 results in the chip 450. The one or more memory devices 410 store instructions relating to the paring and other processes detailed herein. The memory devices 410 may also store the baseline synthesis information and other information used to perform checkpointing and other processes.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of performing an intra-run decision during synthesis to determine a physical implementation of a system-on-chip (SoC) logic design, the method comprising:
    executing, using a processor, a stage of the synthesis with two or more scenarios, each scenario representing a unique combination of values of one or more parameters;
    determining, using the processor, a quality measure associated with each of the two or more scenarios; and
    performing the intra-run decision using the processor, by eliminating one or more of the two or more scenarios for execution in a subsequent stage of the synthesis, the eliminating based on the quality measure associated with each of the two or more scenarios.

2. The method according to claim 1, further comprising generating the two or more scenarios based on a forking process that includes adding each new scenario specific to the stage to each previous scenario obtained from a previous stage of the synthesis.

3. The method according to claim 1, wherein the determining the quality measure includes determining a quality of results (QOR) measure.

4. The method according to claim 3, wherein the determining the QOR measure is based on timing, power consumption, and congestion resulting from each of the two or more scenarios.

5. The method according to claim 1, wherein the eliminating the one or more of the two or more scenarios includes eliminating any scenario with the associated quality measure below a threshold.

6. The method according to claim 1, wherein the eliminating the one or more of the two or more scenarios includes comparing the quality measure associated with each of the two or more scenarios with a baseline.

7. The method according to claim 1, wherein the eliminating the one or more of the two or more scenarios includes eliminating all but a specified number of the two or more scenarios with highest associated quality measures.

8. The method according to claim 1, further comprising determining a total number of iterations for which to run one of the two or more scenarios based on the quality measure associated with each iteration or a runtime constraint.

* * * * *